United States Patent
Littwin et al.

(10) Patent No.: US 10,311,290 B1
(45) Date of Patent: Jun. 4, 2019

(54) SYSTEM AND METHOD FOR GENERATING A FACIAL MODEL

(71) Applicant: Rogue Capital LLC, Wilmington, DE (US)

(72) Inventors: Gideon Littwin, Tel Aviv (IL); Adi Eckhouse Barzilai, Tel Aviv (IL)

(73) Assignee: Rogue Capital LLC, Wilmington, DE (US)

( * ) Notice: Subject to any disclaimer, the term of this patent is extended or adjusted under 35 U.S.C. 154(b) by 74 days.

(21) Appl. No.: 15/498,827

(22) Filed: Apr. 27, 2017

Related U.S. Application Data

(63) Continuation of application No. 15/390,053, filed on Dec. 23, 2016, now abandoned.

(60) Provisional application No. 62/272,081, filed on Dec. 29, 2015.

(51) Int. Cl.
*G06K 9/00* (2006.01)
*G06K 9/62* (2006.01)

(52) U.S. Cl.
CPC ....... *G06K 9/00288* (2013.01); *G06K 9/6201* (2013.01); *G06K 9/6218* (2013.01); *G06K 9/6277* (2013.01); *G06K 2009/00328* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2005/0105780 A1* | 5/2005 | Ioffe | G06K 9/00281 382/118 |
| 2011/0029562 A1 | 2/2011 | Whitby et al. | |
| 2011/0211736 A1* | 9/2011 | Krupka | G06F 17/30259 382/118 |
| 2011/0249904 A1* | 10/2011 | Mochizuki | G06K 9/00288 382/225 |
| 2012/0014560 A1 | 1/2012 | Obrador et al. | |
| 2013/0051670 A1 | 2/2013 | Das et al. | |
| 2013/0048864 A1 | 6/2013 | Dolson et al. | |
| 2013/0148898 A1* | 6/2013 | Mitura | G06K 9/62 382/195 |
| 2013/0243269 A1* | 9/2013 | Jankowski | G06K 9/00 382/118 |
| 2014/0169673 A1* | 6/2014 | Liu | G06K 9/6219 382/170 |
| 2014/0270407 A1* | 9/2014 | Balakrishnan | G06K 9/00275 382/118 |
| 2015/0186497 A1* | 7/2015 | Patton | H04W 4/21 707/740 |

(Continued)

FOREIGN PATENT DOCUMENTS

WO 2015022689 A1 2/2015

*Primary Examiner* — Ryan P Potts
(74) *Attorney, Agent, or Firm* — Meyertons, Hood, Kivlin, Kowert & Goetzel, P.C.; Lawrence J. Merkel

(57) ABSTRACT

A system and method for generation of a facial model. The method includes analyzing, via machine vision, a plurality of multimedia content elements to identify a plurality of facial images shown in the plurality of multimedia content elements; clustering the identified facial images into at least one cluster, wherein the clustering is based on metadata associated with each of the plurality of facial images; and selecting, from among the at least one cluster, a representative cluster representing a face, wherein the facial model is the selected representative cluster.

19 Claims, 5 Drawing Sheets

(56) References Cited

U.S. PATENT DOCUMENTS

2016/0378788 A1\* 12/2016 Panneer ................ G06F 16/583
                                                   382/118
2017/0140213 A1\*  5/2017 Brandt ............... G06K 9/00295

\* cited by examiner

SYSTEM AND METHOD FOR GENERATING A FACIAL MODEL

CROSS-REFERENCE TO RELATED APPLICATIONS

This application is a continuation of U.S. patent application Ser. No. 15/390,053, filed Dec. 23, 2017, which claims the benefit of priority to U.S. Provisional Patent Application No. 62/272,081, filed on Dec. 29, 2015, the contents of which are hereby incorporated by reference in their entireties.

TECHNICAL FIELD

The present disclosure relates generally to facial recognition systems, and more particularly to generating frictionless facial models of a user.

BACKGROUND

A facial recognition system is utilized for automatic identification or verification of a person based on a digital image or a video frame. Facial recognition systems are seeing increasing use for purposes including security (e.g., as used in security systems to identify criminals caught committing a crime on camera or as used to identify faces matching mugshots). As an example, at Super Bowl XXXV in January 2001, police in Tampa Bay, Florida, used facial recognition software to search for potential criminals and terrorists in attendance at the event. Other uses for facial recognition software may include, e.g., user identification (i.e., as a login method instead of or in addition to biometric identification or other forms of identification), categorizing images and videos (e.g., tagging or grouping images based on identification of a particular user's face), and the like.

One of the most common solutions for facial recognition systems is comparing selected facial features from an image or video frame to features in a facial database. Some facial recognition systems identify faces or portions of faces by extracting landmarks, or features, from an image of a user's face. For example, the relative position, size, and/or shape of the user's eyes, nose cheekbones, jaw, or other parts of the user's face may be analyzed. These features are used to search for other images with matching features. Other solutions normalize a gallery of face images and then compress the face data, only saving the data in the image that is useful for facial recognition.

One disadvantage of existing facial recognition solutions is that, although such solutions typically do not require the cooperation of the test subject (e.g., the test subject specifically posing for an image to be analyzed), thereby enabling potential for mass facial recognition, such solutions may still face challenges in effectively recognizing faces for large groups of people (e.g., as needed for railway and airport security). In particular, challenges faced by facial recognition systems include difficulties in identifying faces at an angle (e.g., more than 20 degrees from a frontal view), misidentification, and difficulties identifying faces when visibility is low (e.g., poor lighting, objects or facial hair blocking the face, etc.). Thus, improved techniques for facial recognition would be desirable.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for frictionless generation of a facial model. The method comprises: analyzing, via machine vision, a plurality of multimedia content elements to identify a plurality of facial images shown in the plurality of multimedia content elements; clustering the identified facial images into at least one cluster, wherein the clustering is based on metadata associated with each of the plurality of facial images; and selecting, from among the at least one cluster, a representative cluster representing a face, wherein the facial model is the selected representative cluster.

Certain embodiments disclosed herein also include a non-transitory computer readable medium having stored thereon instructions for causing a processing circuitry to perform a process, the process comprising: analyzing, via machine vision, a plurality of multimedia content elements to identify a plurality of facial images shown in the plurality of multimedia content elements; clustering the identified facial images into at least one cluster, wherein the clustering is based on metadata associated with each of the plurality of facial images; and selecting, from among the at least one cluster, a representative cluster representing a face, wherein the facial model is the selected representative cluster.

Certain embodiments disclosed herein also include a system for frictionless generation of a facial model. The system comprises: a processing circuitry; and a memory, the memory containing instructions that, when executed by the processing circuitry, configure the system to: analyze, via machine vision, a plurality of multimedia content elements to identify a plurality of facial images shown in the plurality of multimedia content elements; cluster the identified facial images into at least one cluster, wherein the clustering is based on metadata associated with each of the plurality of facial images; and select, from among the at least one cluster, a representative cluster representing a face, wherein the facial model is the selected representative cluster.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
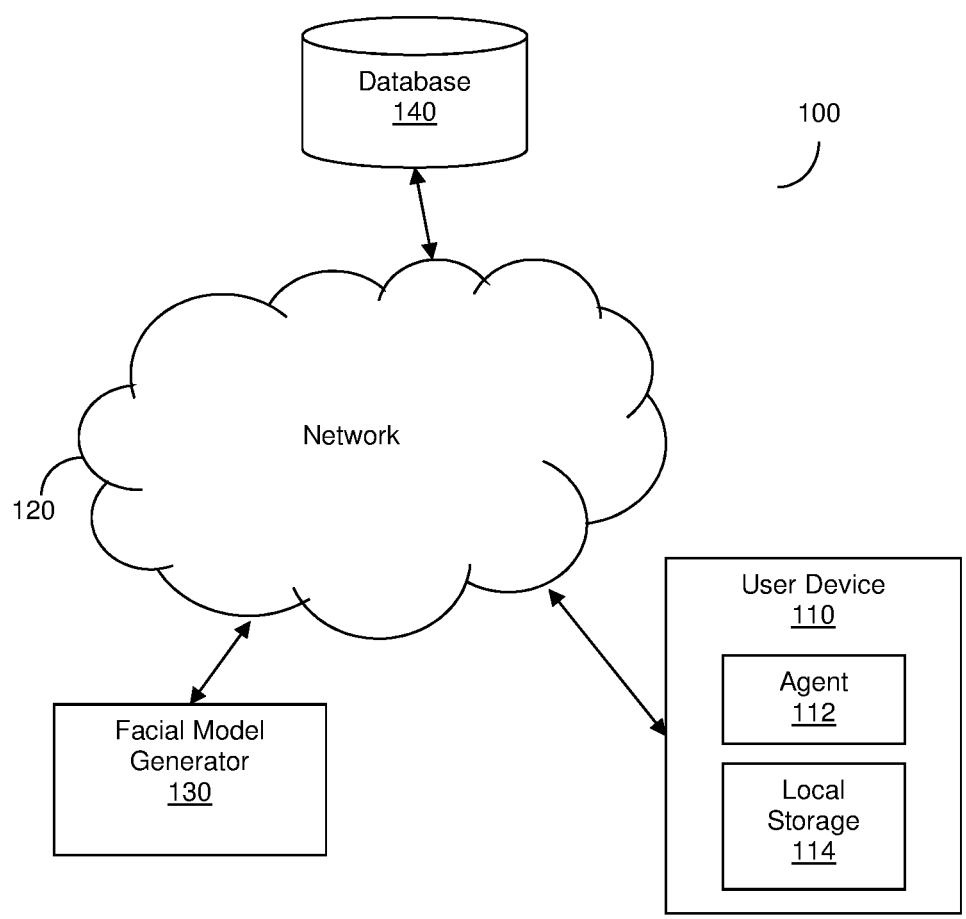
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for generating a frictionless facial model of a user. The frictionless facial model may be utilized by facial recognition systems to identify users based on facial features. A plurality of multimedia content elements is analyzed using machine vision techniques to identify a plurality of facial images shown therein. The identified plurality of facial images is extracted. Based on the extracted facial images, a facial model is generated. Generating the facial model may include clustering the facial images and selecting a cluster that is representative of the face of a person.

FIG. 1 shows an example network diagram 100 utilized to describe the various disclosed embodiments. A user device 110, a facial model generator 130, and a database 140 are communicatively connected via a network 120. The network 120 may be, but is not limited to, a wireless, cellular or wired network, a local area network (LAN), a wide area network (WAN), a metro area network (MAN), the Internet, the worldwide web (WWW), similar networks, and any combination thereof.

The user device 110 may be, but is not limited to, a personal computer, a laptop, a tablet computer, a smartphone, a wearable computing device, or any other device capable of capturing, storing, or sending images and videos, or a combination thereof. As a non-limiting example, the user device 110 may be a smart phone including a camera. In some implementations, the user device 110 may have installed thereon an agent 112 utilized for communications with the facial model generator 130. In another embodiment, the user device 110 may include a local storage 114.

The user device 110, the facial model generator 130, or both, is configured to access at least one storage to retrieve a plurality of multimedia content elements to be analyzed. The at least one storage may include, but is not limited to, the local storage 114 of the user device 110, the database 140, or both. The accessed storage may store, e.g., multimedia content elements such as images, videos, portions thereof, and the like. The database 140 may further be a web source of, e.g., a social network or other image-collecting service, and associated with a user of the user device 110. According to yet another embodiment, the database 140 may be accessed only by the facial model generator 130 in cases where the database 140 is operated by a third party, for example, a bank, a municipal authority, etc. Limiting access to the database 140 improves security of the database 140. To this end, the facial model generator 130 may act as a security system configured to control access to information in the database 140 based on facial recognition.

In an embodiment, the facial model generator 130 is configured to receive a request from, e.g., the agent 112, to generate a computer readable facial model (of, for example, a user of the user device 110) based on the retrieved plurality of multimedia content elements. The facial model is a cluster of multimedia content elements representative of a face of a person. In a further embodiment, the facial model generator 130 is configured to analyze, using one or more machine vision techniques, the plurality of multimedia content elements to identify a plurality of facial images shown in the plurality of multimedia content elements.

Typically, for a plurality of multimedia content elements illustrating one or more views of a person, a plurality of facial images of the person are shown in the multimedia content elements. Each facial image may be, but is not limited to, a multimedia content element showing a face or at least a portion of a face (for example, facial features such as e.g., a nose, a mouth, an eye, a cheek, etc.) of a person. The person may be, but is not limited to, the user of the user device 110.

In an embodiment, the analysis of the plurality of multimedia content elements may include, but is not limited to, generating signatures for a multimedia content element. Each generated signature may be compared to a plurality of similar signatures. The signature comparison may include, but is not limited to, mapping a signature vector representation into vector space and using Euclidean distance as the first approximation. The signature comparison may further include reducing the number of dimensions in the vector space.

In another embodiment, the facial model generator 130 may be configured to analyze the generated signatures and, based on the signature analysis, to automatically generate a computer-readable frictionless facial model. In a further embodiment, the signature analysis may include comparing a signature of each facial image to signatures of facial images stored in, e.g., the database 140. As a non-limiting example, the database 140 may be a database of a municipal entity storing images of a user of the user device 110. Upon determining a match between at least one signature generated for the user and signatures of at least one facial image stored in the database 140, the matching at least one facial image may be selected as representative of the user.

In another embodiment, generating the facial model may include clustering the facial images into clusters. The clustering may be, for example, based on metadata associated with the facial images. In a further embodiment, the facial model generator 130 may be configured to generate, for each cluster, a score. The generated scores indicate a probability that a cluster represents the face of the person. The scores may be generated based on, but not limited to, metadata associated with each multimedia content element in which the facial images of the cluster are shown. Such metadata may indicate, but is not limited to, a type of capturing device used to capture the multimedia content element, a location of the capturing device relative to other capturing devices, whether the capturing device is a front-facing camera or a rear-facing "selfie" camera, a geographic location of capturing of the multimedia content element, tags associated with the multimedia content element, an owner of the capturing device used to capture the multimedia content element, a combination thereof, and the like.

As a non-limiting example, the user device 110 may include at least two capturing devices, with one capturing device on each side of the user device 110. One capturing device is a "selfie" camera rear facing on the user device 110, and the other capturing device is a front facing camera. Metadata for each image captured via the user device 110 indicates which camera was utilized to capture the image. The facial model generator 130 may be configured to generate higher scores for clusters including images that were captured by the rear facing camera than for images that were captured by the front facing camera. This configuration may be utilized because images taken using rear facing "selfie" cameras are more likely to capture a person's face than images taken using front facing cameras.

In an embodiment, based on the generated scores, the facial model generator 130 is configured to automatically select a representative cluster of multimedia content elements. The representative cluster may be, e.g., the cluster having the highest score. The selected representative cluster is utilized as a facial model of a person shown in the multimedia elements of the cluster.

The generated facial models are frictionless, i.e., the facial models are generated without requesting any designated or specially captured input from a user of the user device 110. The frictionless facial models may be utilized for, e.g., verifying a user's identity, facial recognition, and the like. As a non-limiting example use, when a user of the user device 110 attempts to unlock the user device 110, the user device 110 may be configured to capture an image of the attempting user. The captured image may be compared to a previously generated facial model of a user authorized to unlock the user device 110 to determine whether the attempting user is authorized to unlock the user device 110.

In another embodiment, the generated facial models may be adaptively updated based on analysis of newly obtained multimedia content elements. Such adaptive updating may be in real-time, and may be utilized to improve accuracy of the model as facial features of a person change. For example, the facial features of a child typically change significantly as he or she becomes older, so updates to facial models may prevent issues related to accurately representing, e.g., a teenager's or young adult's face.

In another embodiment, different facial models (i.e., of different persons) may be utilized to control use of services accessible to the user device 110. To this end, in a further embodiment, the facial model generator 130 may further include a profile manager (e.g., the profile manager 250, FIG. 2). The profile manager may be utilized to selectively allocate rights and access to services available to the user device 110 based on user profiles and management rules. For example, management rules may permit access to both a bank account associated with the user device 110 and to an email account via the user device 110 for a first user profile, and may only permit access to an email account via the user device 110 for a second user profile.

In a further embodiment, the profile manager may be configured to utilize facial models as part of a multi-factor authentication. To this end, the profile manager may be configured to, e.g., receive and check login credentials, require a particular user device, a combination thereof, and the like, in addition to comparing facial models to obtained multimedia content elements. Such multi-factor authentication increases security of access to the user device 110, services available thereto, functions thereof, and the like.

It should be understood that the embodiments disclosed herein are not limited to the specific architecture illustrated in FIG. 1, and other architectures may be equally used without departing from the scope of the disclosed embodiments. Specifically, the facial model generator 130 may reside in a cloud computing platform, a datacenter, and the like. Moreover, in an embodiment, there may be a plurality of facial model generators operating as described hereinabove and configured to either have one as a standby, to share the load between them, or to split the functions between them.

It should further be noted that multiple facial models may be generated based on the plurality of multimedia content elements without departing from the scope of the disclosure. Specifically, multiple groups of multimedia content elements may be clustered and utilized to generate facial models, with each cluster being representative of a face of a different person.

It should also be noted that the embodiments described herein above with respect to FIG. 1 are discussed in relation to a user device 110 and a database 140 merely for simplicity purposes and without limitations on the disclosed embodiments. Multiple user devices 110, multiple databases 140, or both, may be utilized for retrieving multimedia content without departing from the scope of the disclosure.

Figure 2:
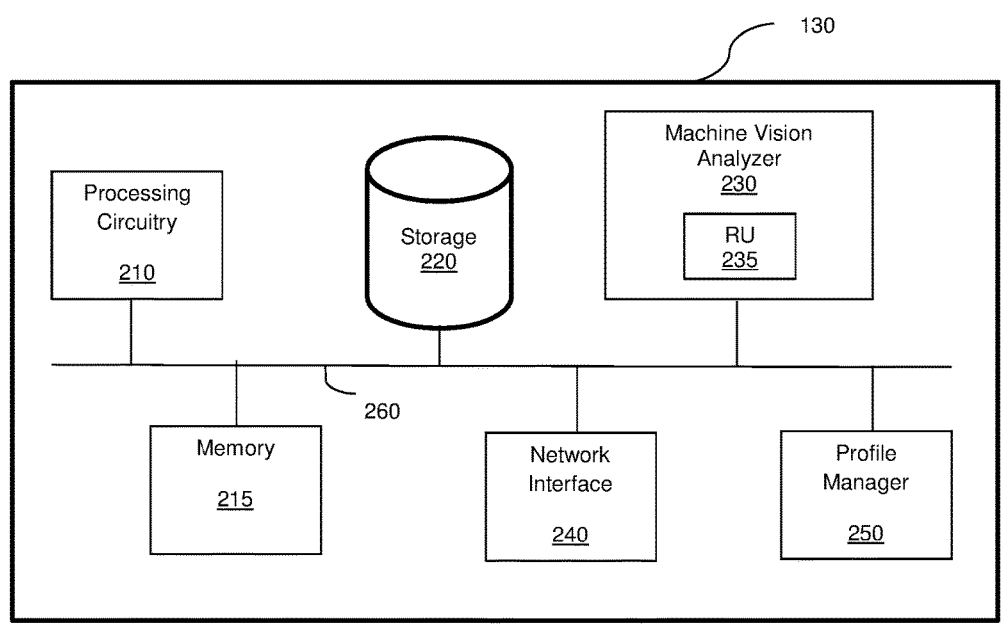
FIG. 2 is a schematic diagram of a facial model generator according to an embodiment.

FIG. 2 is an example schematic diagram of the facial model generator 130 according to an embodiment. In an embodiment, the facial model generator 130 includes a processing circuitry 210 coupled to a memory 215, a storage 220, a machine vision analyzer 230, and a network interface 240. In an optional embodiment, the facial model generator 130 may include a profile manager 250. In an embodiment, the components of the facial model generator 130 may be communicatively connected via a bus 260.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 215 may be volatile (e.g., RAM, etc.), non-volatile (e.g., ROM, flash memory, etc.), or a combination thereof. In one configuration, computer readable instructions to implement one or more embodiments disclosed herein may be stored in the storage 220.

In another embodiment, the memory 215 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to perform frictionless generation of facial models, as discussed herein.

The storage 220 may be magnetic storage, optical storage, and the like, and may be realized, for example, as flash memory or other memory technology, CD-ROM, Digital Versatile Disks (DVDs), or any other medium which can be used to store the desired information.

The machine vision analyzer 230 may include, but is not limited to, a feature and/or pattern recognition unit (RU) 235 configured to identify patterns, features, or both, in unstructured data sets. Specifically, in an embodiment, the machine vision analyzer 230 is configured to identify at least facial images in the unstructured data. The identified facial images may be extracted and clustered to generate a facial model.

The network interface 240 allows the facial model generator 130 to communicate with the user device 110, the database 140, or a combination of, for the purpose of, for example, retrieving multimedia content elements, granting and denying access to services, and the like.

In an optional embodiment, the profile manager 250 is configured to manage access to services available to the user device 110 based on user profiles and management rules. In a further embodiment, the user device may send, to the facial model generator 130, a request to access a service (e.g., a banking service, a messaging service, a booking service, a shopping service, a credit service, etc.) in real-time. The request may include at least one multimedia content element showing the user attempting to use the user device to access the service. If the at least one multimedia content element does not match a facial model associated with a user profile authorized to access the service, access to the service may be automatically denied. Automatically granting or denying access to services in real-time based on multimedia content elements captured automatically via a user device allows for seamless and efficient incorporation of secured access to, for example, services such as banking and messaging services.

In a further optional embodiment, the management rules may include multi-factor authentication rules. The multi-factor authentication rules may include requiring successful provision of login credentials (e.g., a username and password), a particular user device, matching of multimedia content elements or portions thereof with a facial model, or a combination thereof, before access to the service is granted.

It should be understood that the embodiments described herein are not limited to the specific architecture illustrated in FIG. 2, and other architectures may be equally used without departing from the scope of the disclosed embodiments.

It should be noted that the embodiments described herein are not limited to the specific architecture illustrated in FIG. 2, and that other architectures may be equally used without departing from the scope of the disclosed embodiments. Additionally, the components of the facial model generator 130 may be implemented in, for example, a user device (e.g., the user device 110) to enable the user device to generate facial models according to the embodiments described herein without departing from the scope of the disclosure.

Figure 3:
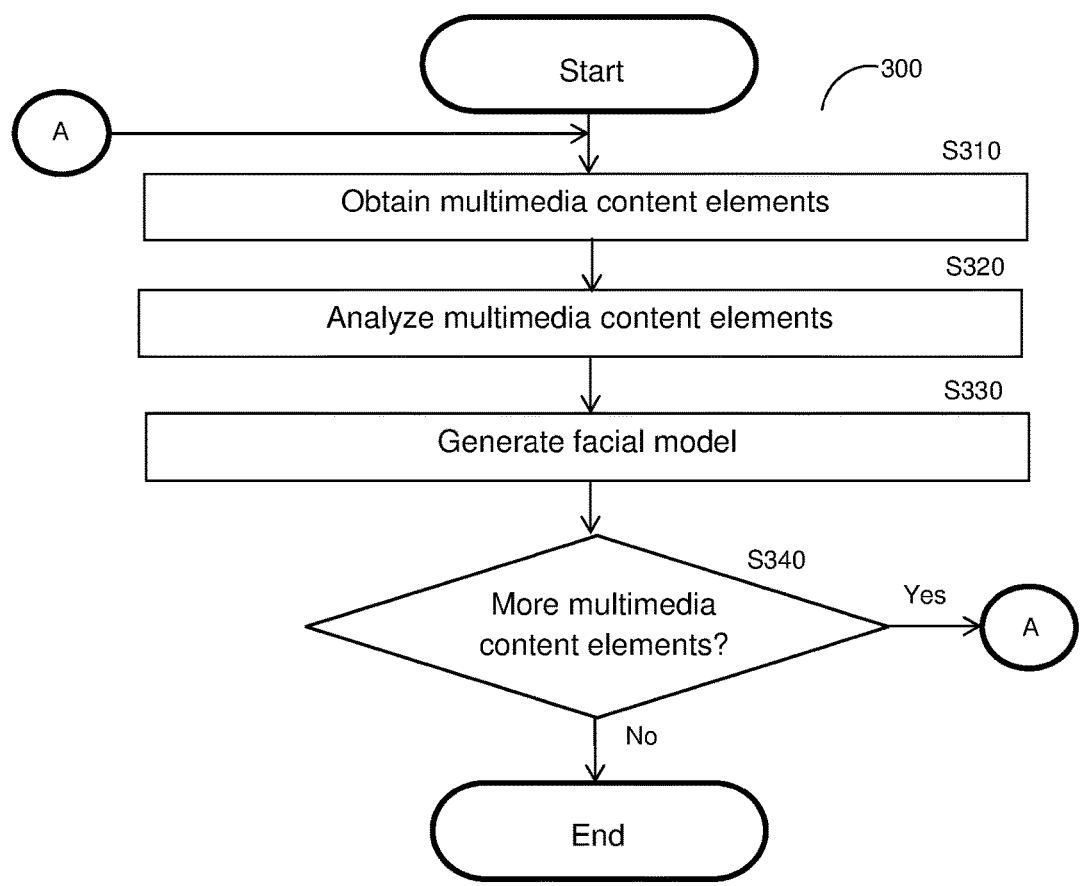
FIG. 3 is a flowchart illustrating a method for generating a facial model according to an embodiment.

FIG. 3 is an example flowchart 300 illustrating a method for generating a frictionless facial model according to an embodiment. In an embodiment, the method may begin when a request to generate a facial model is received. In another embodiment, the method may be performed by a facial model generator (e.g., the facial model generator 130, FIG. 1).

At S310, a plurality of multimedia content elements to be analyzed is obtained. In an embodiment, the plurality of multimedia content elements may be included in the received request. In another embodiment, the plurality of multimedia content elements may be retrieved (e.g., from the database 140, FIG. 1).

At S320, the obtained plurality of multimedia content elements is analyzed. In an embodiment, S320 includes using machine vision to recognize facial images in the multimedia content elements. The machine vision may be performed using one or more techniques, either now known in the art or hereinafter developed, for visual identification of objects in images, video, and other such multimedia content At S330, a computer readable facial model is generated. In an embodiment, S330 may include clustering facial images and selecting a representative cluster, wherein the generated facial model is the selected cluster. The facial model is a cluster of facial image multimedia content elements that show a face of a person. The facial model is frictionless, i.e., the facial model is generated automatically without requiring cooperation of the user with respect to, e.g., angle, lighting, alignment, and other multimedia content features. Generating facial models is described further herein below with respect to FIG. 4.

At optional S340, it may be checked whether additional multimedia content elements can be obtained and, if so, execution continues with S310; otherwise, execution terminates. Obtaining additional multimedia content elements may be utilized to, e.g., update the facial model. To this end, in an embodiment, S340 may include periodically checking for additional multimedia content elements. For example, based on timestamps in metadata of multimedia content elements stored in a database of a social networking service, it may be determined whether new multimedia content elements have been uploaded since the most recent facial model generation and, if so, the new multimedia content elements may be retrieved and analyzed. During subsequent analysis, new multimedia content elements may be matched to existing clusters and each new multimedia content element matching a cluster above, e.g., a predetermined threshold, is added to the cluster. This allows for updating the facial model as a user's face changes due to, e.g., change in weight, tan, shaving, new facial hair, age, combinations thereof, and the like.

Figure 4:
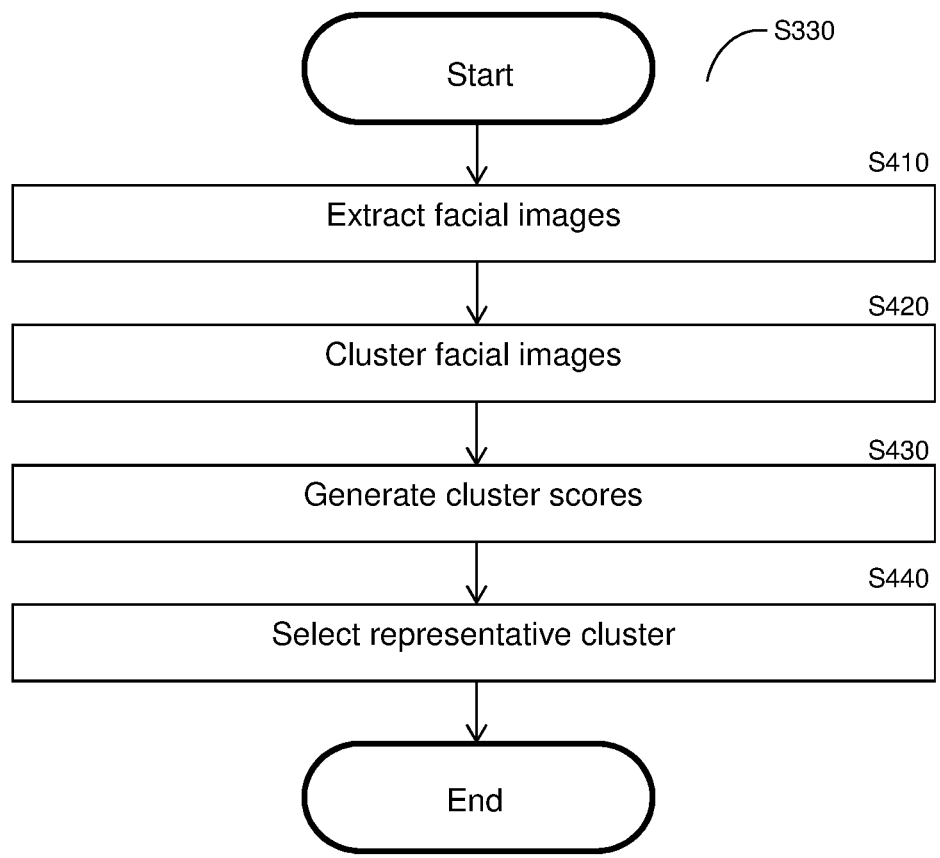
FIG. 4 is a flowchart illustrating a method for analyzing a plurality of facial images according to an embodiment.

FIG. 4 is an example flowchart S330 illustrating a method for generating a facial model according to an embodiment.

At S410, facial images in a plurality of multimedia content elements are extracted. In an embodiment, each element identified as containing a facial image (either partial or complete) is extracted. The identification may be based on analysis using one or more machine vision techniques (e.g., as described further herein above with respect to S320, FIG. 3).

At S420, the extracted facial images are clustered into at least one cluster based on similarities among the facial images. In an embodiment, S420 includes generating a signature for each facial image and matching, based on the generated signatures, the facial images. In another embodiment, S420 may include comparing each generated signature to known valid signatures of facial images stored in, e.g., a database to determine whether the facial images for which the signatures were generated are verified. Such verification improves accuracy of the facial model by ensuring that facial images from different users are not incorporated into the facial model.

At S430, a score is generated for each cluster. Each score indicates a probability that the cluster represents the face of the user. In an embodiment, the scores may be generated based on metadata of each facial image. The metadata of a facial image may be, but is not limited to, metadata associated with a multimedia content element from which the facial image was extracted. In an embodiment in which facial models of multiple persons are to be generated, each cluster may receive one score per person (i.e., scores representing the likelihood that a cluster represents the face of each of multiple persons).

At S440, based on the generated scores, a representative cluster is selected. The representative cluster may be the cluster that has the highest probability of representing the face of the user. In an embodiment in which facial models of multiple persons are to be generated, multiple representative clusters may be selected, with each representative cluster being likely to represent the face of a distinct person. The selected cluster is utilized as the facial model.

Figure 5:
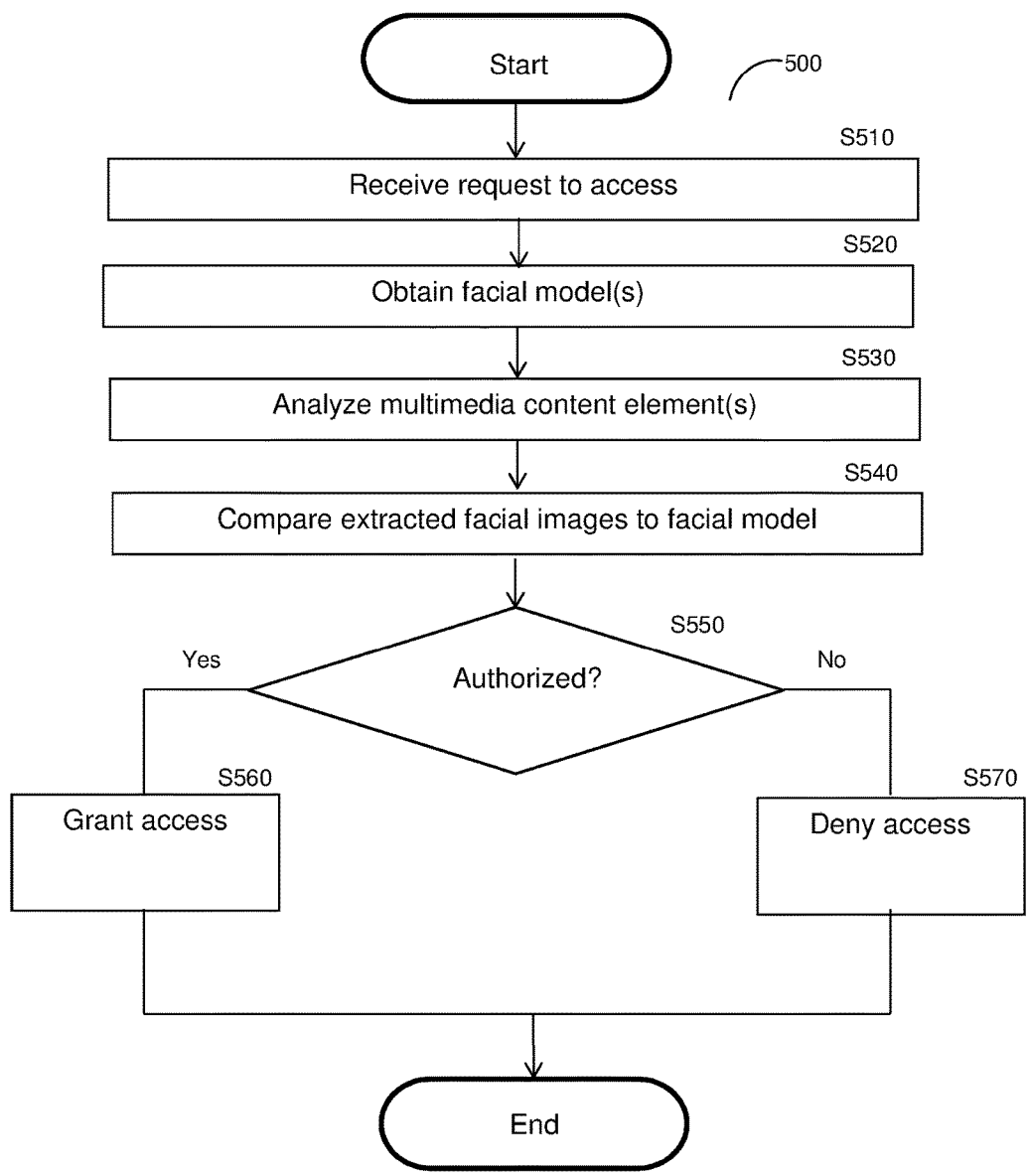
FIG. 5 is a flowchart illustrating a method for providing secured access based on a facial model according to an embodiment.

FIG. 5 is an example flowchart 500 illustrating a method for providing secured access based on a facial model according to an embodiment. The method may utilize a facial model generated as described further herein above with respect to FIGS. 3 and 4. In an embodiment, the method may be performed by a facial model generator including a profile manager (e.g., the facial model generator 130 including the profile manager 250, FIG. 2). In another embodiment, the method may be performed by a user device (e.g., the user device 110, FIG. 1) to control access to functions (e.g., messaging, web browsing, calling, using sensors, etc.) of the user device. In various embodiments, the method of FIG. 5 may be performed in real-time as a user attempts to access a service or function so as to provide secure and efficient access to the service or function only if the user is authenticated based on facial models of authorized users.

At S510, a request to access, e.g., a secured activity is received. Each secured activity is only accessible to a particular set of users. The secured activities may be, but are not limited to, third party services accessible to a user of the user device (e.g., using a banking, messaging, employee, or municipal account), functions of the user device (e.g., unlocking the user device, web browsing, using sensors of the user device, sending messages, reading messages, etc.), using a user profile of the user device, a combination thereof, and the like.

Each user profile may, e.g., be permitted to access only a particular set of secured activities based on a set of access permission rules. As a non-limiting example, if a child and his or her parent are associated with respective user profiles of the user device, it may be desirable for the child to have limited or no access to messaging, banking, settings, or other features of the user device. Thus, according to the embodiments of FIG. 5, access to such features may be controlled based on a facial model associated with the child's user profile.

The request includes, but is not limited to, at least one multimedia content element. The request may be received from, e.g., a user device. In an embodiment, the request may be received in real-time (e.g., when a user of the user device attempts to access, for example, one or more services or functions available to the user device). In a further embodiment, the at least one multimedia content element may be captured and sent by the user device when the user of the user device attempts to access a restricted service or function.

At S520, at least one facial model of at least one authorized user is obtained. Each authorized user is permitted to utilize the secured activity.

At S530, the at least one multimedia content element of the request is analyzed. In an embodiment, S530 includes extracting at least one facial image in the multimedia content elements of the request.

At S540, the extracted at least one facial image is compared to the at least one facial model. In an embodiment, S540 may include generating a signature for each of the at least one facial image, each facial image of the at least one facial model, or both. In a further embodiment, S540 may include comparing signatures of the at least one facial image with signatures of the at least one facial model.

At S550, it is determined, based on the comparison, whether the attempting user is authorized to access the secured activity and, if so, execution continues to S560; otherwise, execution continues with S570. In various embodiments, S550 may further include checking if login credentials (e.g., a username and password) provided by the attempting user are correct. As such, the facial model comparison may be utilized as a portion of authentication for a multi-factor authentication.

At S560, when it is determined that the attempting user is authorized, access to the secured activity is granted. Granting access to the secured activity may include, but is not limited to, allowing the user to utilize a function of the user device, sending information of a secured service (e.g., sending bank account information), and the like. At S570, when it is determined that the attempting user is not authorized, access to the secured activity is denied.

It should be noted that various embodiments described herein are discussed with respect to generating facial models of persons merely for simplicity purposes and without limitation on the disclosed embodiments. Facial models for non-human entities such as, but not limited to, animals (e.g., a dog or cat) or any other entity possessing facial features may be equally generated without departing from the scope of the disclosure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generation of a facial model, comprising:
analyzing a plurality of multimedia content elements to identify a plurality of facial images shown in the plurality of multimedia content elements;
clustering the identified facial images into at least one cluster, wherein the clustering is based on metadata associated with each of the plurality of facial images;
selecting, from among the at least one cluster, a representative cluster representing a face, wherein the facial model is the selected representative cluster;
receiving a request to access a secure activity;
capturing at least one additional multimedia content element in response to the request to access the secure activity;
analyzing the at least one additional multimedia content element to identify at least one additional facial image;
comparing the at least one additional facial image to the facial model; and
selectively permitting access to the secure activity responsive to a result of the comparing of the at least one additional facial image to the facial model.

2. The method of claim 1, further comprising:
generating, for each cluster, a score, wherein each score indicates a probability that the cluster represents the face, wherein the representative cluster is selected based on the generated at least one score.

3. The method of claim 2, further comprising:
generating, for each identified facial image, a signature; and
comparing the generated signatures, wherein the clustering is based on the comparison of the generated signatures.

4. The method of claim 3, wherein comparing the generated signatures further comprises:
mapping a signature vector representation into vector space, wherein Euclidean distance is utilized as a first approximation.

5. The method of claim 4, further comprising:
reducing a number of dimensions in the vector space.

6. The method of claim 3, further comprising:
comparing each generated signature to a plurality of facial image signatures stored in a database; and
determining, based on the comparison of each generated signature to the plurality of facial image signatures, at least one matching facial image of the identified plurality of facial images, wherein the representative cluster includes the determined at least one matching facial image.

7. The method of claim 1, wherein the metadata indicates whether a sensor that captured each of the plurality of multimedia content elements is a front facing sensor or a rear facing sensor.

8. The method of claim 1, further comprising:
receiving, from a user device, a request to generate the facial model, wherein the request to generate the facial model includes the plurality of multimedia content elements.

9. The method of claim 1, further comprising:
adaptively updating the generated facial model based on at least one new multimedia content element.

10. A non-transitory computer readable medium having stored thereon instructions which, when executed by processing circuitry, cause the processing circuitry to perform a process, the process comprising:
analyzing a plurality of multimedia content elements to identify a plurality of facial images shown in the plurality of multimedia content elements;
clustering the identified facial images into at least one cluster, wherein the clustering is based on metadata associated with each of the plurality of facial images;
selecting, from among the at least one cluster, a representative cluster representing a face, wherein the facial model is the selected representative cluster;
receiving a request to access a secure activity;
capturing at least one additional multimedia content element in response to the request to access the secure activity;
analyzing the at least one additional multimedia content element to identify at least one additional facial image;
comparing the at least one additional facial image to the facial model; and
selectively permitting access to the secure activity responsive to a result of the comparing of the at least one additional facial image to the facial model.

11. A system for generation of a facial model, comprising:
processing circuitry; and
a memory, the memory containing instructions that, when executed by the processing circuitry, configure the system to:
analyze a plurality of multimedia content elements to identify a plurality of facial images shown in the plurality of multimedia content elements;
cluster the identified facial images into at least one cluster, wherein the clustering is based on metadata associated with each of the plurality of facial images;
select, from among the at least one cluster, a representative cluster representing a face, wherein the facial model is the selected representative cluster;
receive a request to access a secure activity;
capture at least one additional multimedia content element in response to the request to access the secure activity;
analyze the at least one additional multimedia content element to identify at least one additional facial image;
compare the at least one additional facial image to the facial model; and
selectively permit access to the secure activity responsive to a result of the compare of the at least one additional facial image to the facial model.

12. The system of claim 11, wherein the system is further configured to:
generate, for each cluster, a score, wherein each score indicates a probability that the cluster represents the face, wherein the representative cluster is selected based on the generated at least one score.

13. The system of claim 12, wherein the system is further configured to:
generate, for each identified facial image, a signature; and
compare the generated signatures, wherein the clustering is based on the comparison of the generated signatures.

14. The system of claim 13, wherein the system is further configured to:
map a signature vector representation into vector space, wherein Euclidean distance is utilized as a first approximation.

15. The system of claim 14, wherein the system is further configured to:
reduce a number of dimensions in the vector space.

16. The system of claim 13, wherein the system is further configured to:
compare each generated signature to a plurality of facial image signatures stored in a database; and
determine, based on the comparison of each generated signature to the plurality of facial image signatures, at least one matching facial image of the identified plurality of facial images, wherein the representative cluster includes the determined at least one matching facial image.

17. The system of claim 11, wherein the metadata indicates whether a sensor that captured each of the plurality of multimedia content elements is a front facing sensor or a rear facing sensor.

18. The system of claim 11, wherein the system is further configured to:
receive, from a user device, a request to generate the facial model, wherein the request to generate the facial model includes the plurality of multimedia content elements.

19. The system of claim 11, wherein the system is further configured to:
adaptively update the generated facial model based on at least one new multimedia content element.

* * * * *